US010255362B2

(12) United States Patent
Rodefer et al.

(10) Patent No.: US 10,255,362 B2
(45) Date of Patent: Apr. 9, 2019

(54) METHOD FOR PERFORMING A SEARCH, AND COMPUTER PROGRAM PRODUCT AND USER INTERFACE FOR SAME

(75) Inventors: Benjamin Rodefer, Berkeley, CA (US); Nathan Perkins, Corrales, NM (US)

(73) Assignee: Benjamin Rodefer, Corrales, NM (US)

( * ) Notice: Subject to any disclaimer, the term of this patent is extended or adjusted under 35 U.S.C. 154(b) by 1022 days.

(21) Appl. No.: 10/305,126

(22) Filed: Nov. 27, 2002

(65) Prior Publication Data
US 2003/0120779 A1 Jun. 26, 2003

Related U.S. Application Data

(60) Provisional application No. 60/333,493, filed on Nov. 28, 2001.

(51) Int. Cl.
G06F 17/30 (2006.01)

(52) U.S. Cl.
CPC .............. G06F 17/30864 (2013.01)

(58) Field of Classification Search
CPC ................................. G06F 17/30864
USPC ........ 707/102, 203–205, 3; 715/513; 704/10
See application file for complete search history.

(56) References Cited

U.S. PATENT DOCUMENTS

| 3,704,452 | A | * | 11/1972 | Beausoleil et al. ............. 365/78 |
| 5,189,610 | A | * | 2/1993 | Kaplan et al. .................. 704/10 |
| 5,913,215 | A | * | 6/1999 | Rubinstein et al. ............ 707/10 |
| 5,924,059 | A | * | 7/1999 | Kawanabe ...................... 704/10 |
| 6,009,459 | A | * | 12/1999 | Belfiore et al. ............... 709/203 |
| 6,012,055 | A | * | 1/2000 | Campbell et al. |
| 6,044,387 | A | * | 3/2000 | Angiulo et al. .............. 715/257 |
| 6,292,894 | B1 | * | 9/2001 | Chipman et al. ............. 713/168 |
| 6,330,554 | B1 | * | 12/2001 | Altschuler ............. G06Q 30/02 706/21 |
| 6,349,307 | B1 | * | 2/2002 | Chen |
| 6,434,745 | B1 | * | 8/2002 | Conley et al. ................. 717/177 |
| 6,446,092 | B1 | * | 9/2002 | Sutter ........................... 707/203 |
| 6,460,032 | B1 | * | 10/2002 | Ludtke ............................... 707/3 |
| 6,460,060 | B1 | * | 10/2002 | Maddalozzo et al. ........ 715/513 |
| 6,667,751 | B1 | * | 12/2003 | Wynn et al. .................. 715/833 |
| 6,836,769 | B2 | * | 12/2004 | Lunenfeld ......................... 707/3 |
| 6,917,972 | B1 | * | 7/2005 | Basko et al. .................. 709/224 |
| 6,925,444 | B1 | * | 8/2005 | McCollom et al. ........... 705/14 |
| 7,483,883 | B2 | * | 1/2009 | Barth et al. |

(Continued)

FOREIGN PATENT DOCUMENTS

WO     WO 9927432 A2 * 6/1999 ....... G06F 17/30569

OTHER PUBLICATIONS

PCT/US98/27465, Wassom et al., "Managing Navigation and History Information", Dec. 23, 1998, pp. 1-39.*

*Primary Examiner* — James Trujillo
*Assistant Examiner* — Hubert Cheung
(74) *Attorney, Agent, or Firm* — Sughrue Mion, PLLC; Richard C. Turner

(57) ABSTRACT

A method of accessing computer networks and data sources simultaneously is disclose. The method includes the steps of (a) selecting at least one of a target source to be accessed; and (b) running target parsing tool of said at least one of a target source if parsing is required. Also, there is disclosed a user interface for accessing multiple target sources simultaneously. The user interface includes a text entry field, a scroll-down menu for selecting one or more target sources, and an infobar for displaying information.

24 Claims, 14 Drawing Sheets

(56) References Cited

U.S. PATENT DOCUMENTS

| | | | |
|---|---|---|---|
| 7,668,811 B2* | 2/2010 | Janssens et al. | 707/719 |
| 2002/0038348 A1* | 3/2002 | Malone | G06F 17/30864 709/217 |
| 2002/0073075 A1* | 6/2002 | Dutta | G06F 17/30206 |
| 2002/0129053 A1* | 9/2002 | Chan et al. | 707/503 |
| 2002/0178264 A1* | 11/2002 | Benda | G06F 9/5072 709/227 |
| 2002/0198962 A1* | 12/2002 | Horn et al. | 709/218 |
| 2003/0037069 A1* | 2/2003 | Davison | G06F 17/30893 |
| 2003/0120681 A1* | 6/2003 | Baclawski | 707/103 R |
| 2005/0010567 A1* | 1/2005 | Barth et al. | 707/3 |
| 2005/0267871 A1* | 12/2005 | Marchisio | G06F 17/30672 |
| 2006/0129543 A1* | 6/2006 | Bates et al. | 707/3 |
| 2012/0102100 A1* | 4/2012 | Soukup | G06F 9/547 709/203 |

* cited by examiner

General search (fig. 1)
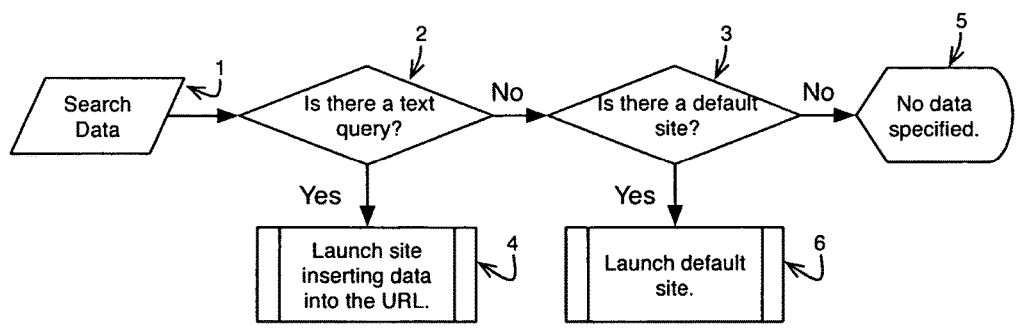

Auto revert execution (fig. 2)
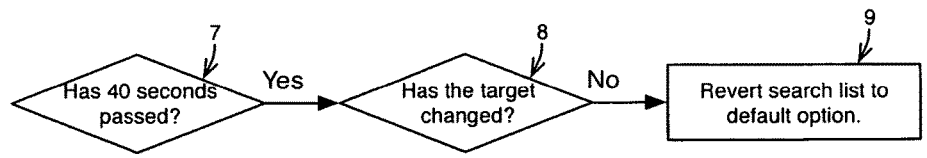

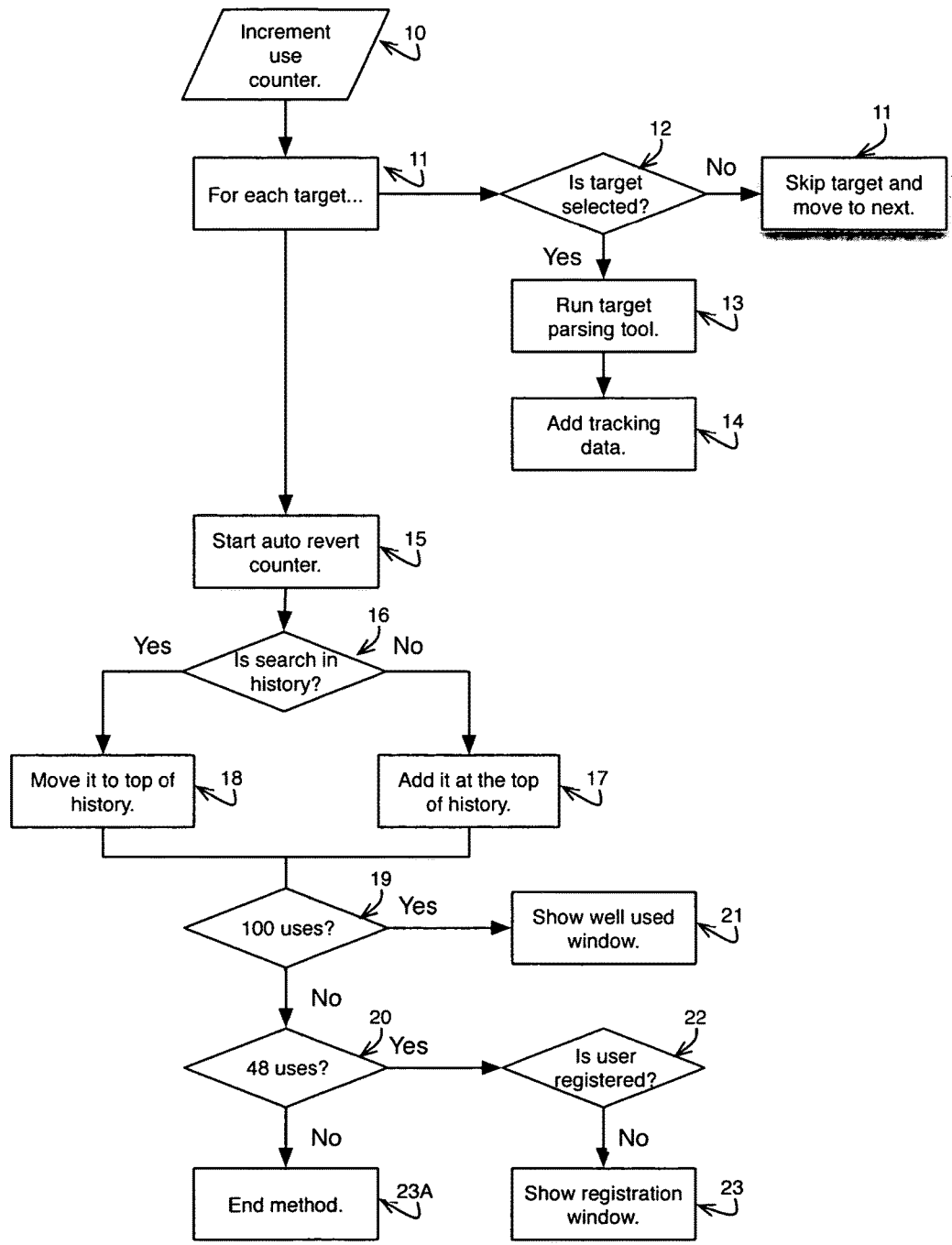
Main search method (fig. 3)

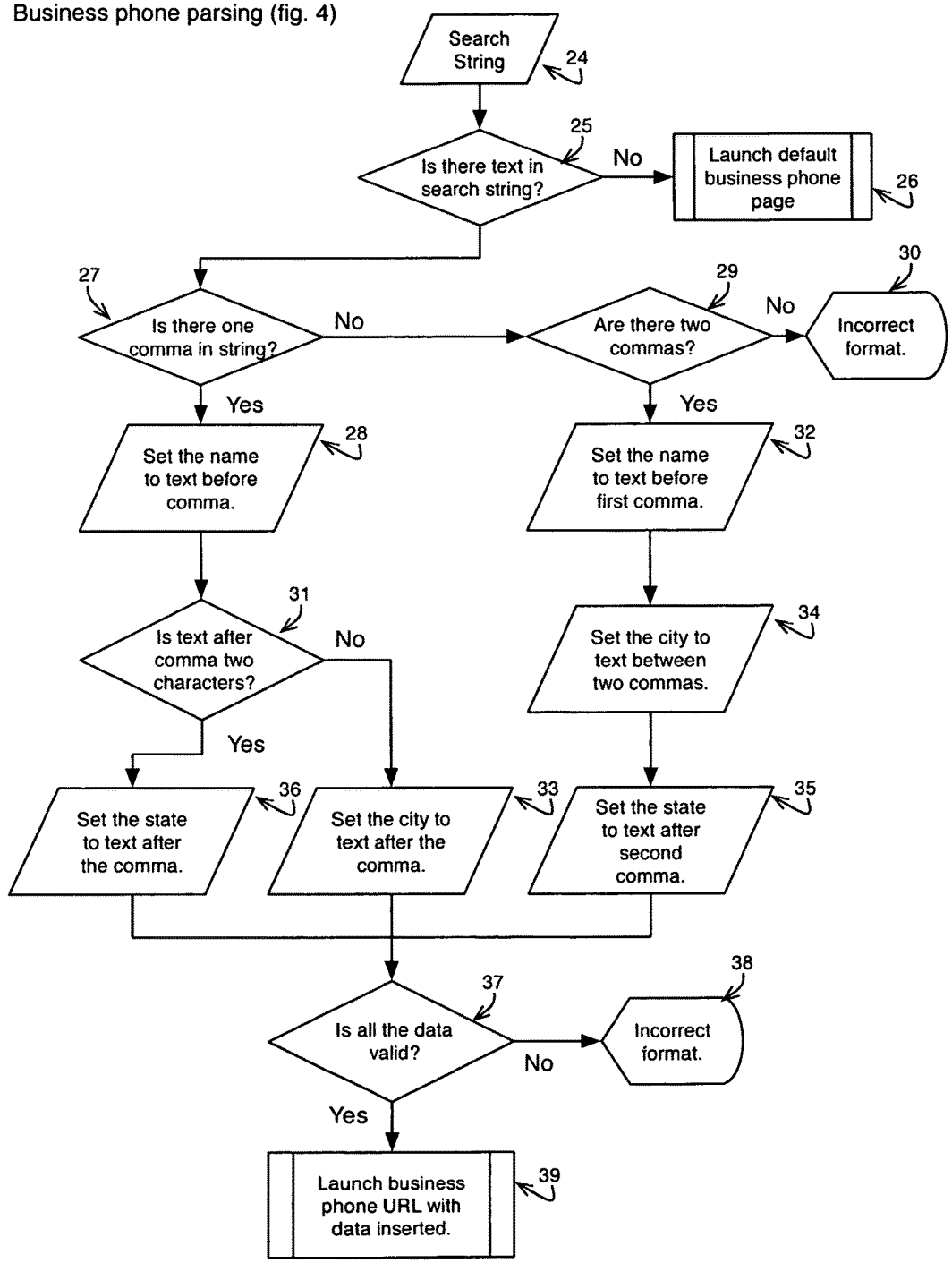

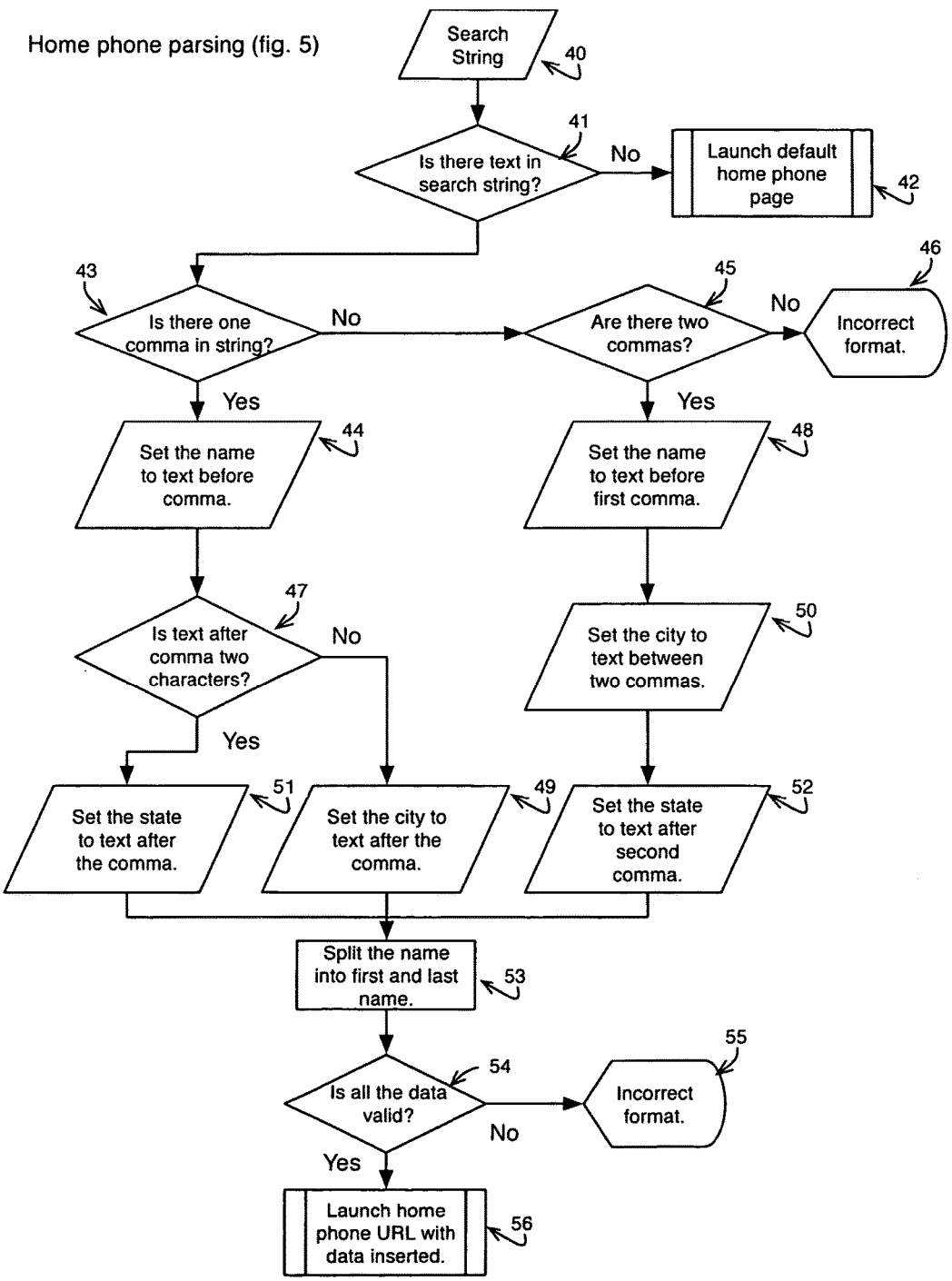

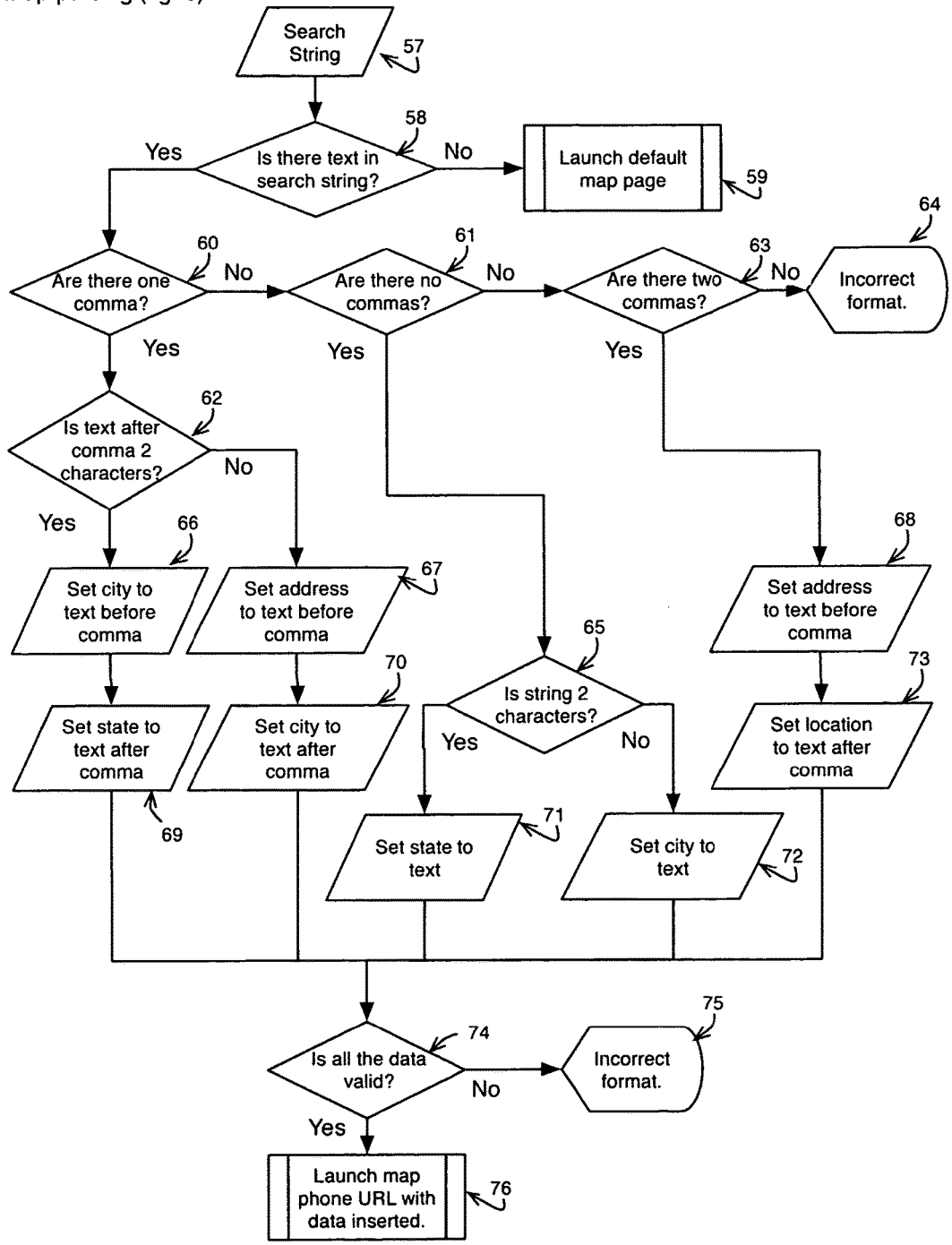

Movie parsing (fig. 7)
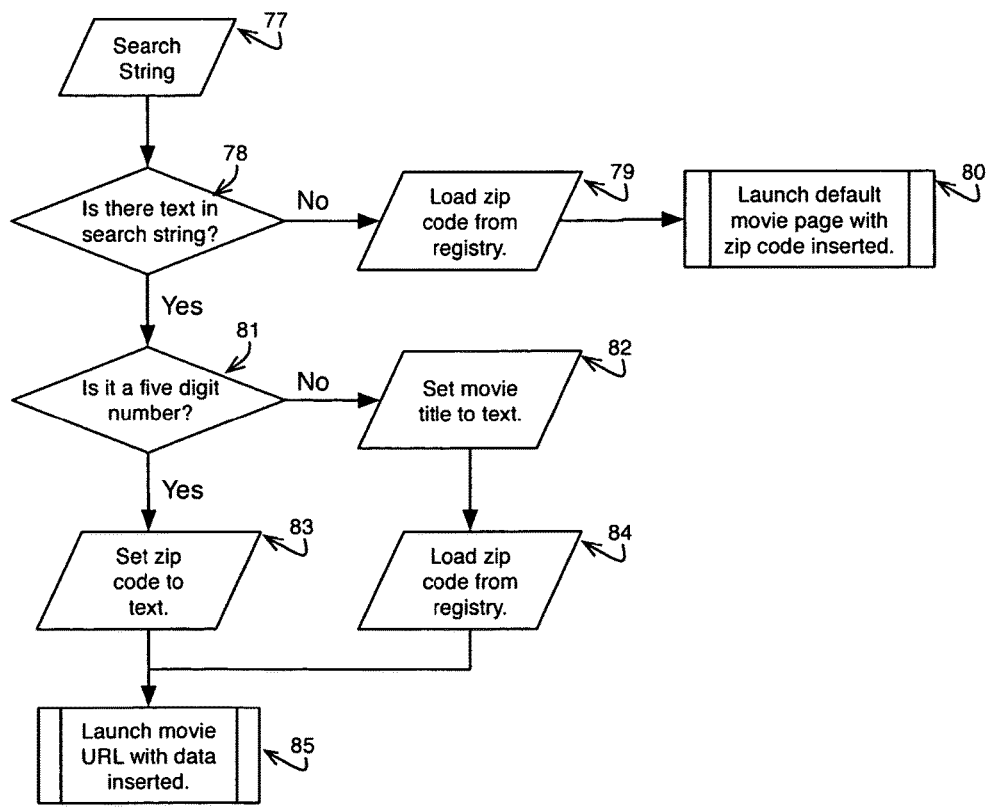

E-mail parsing (fig. 8)
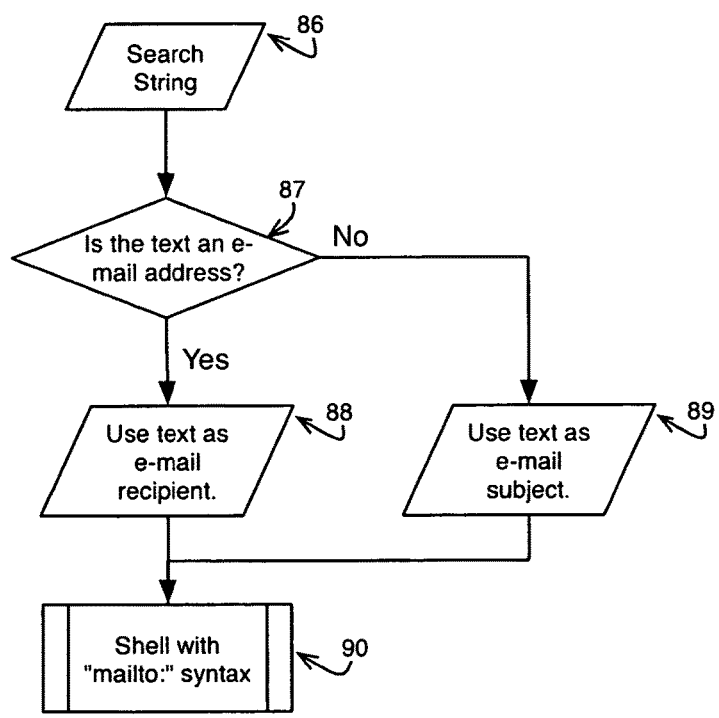

Spell check method (fig. 9)
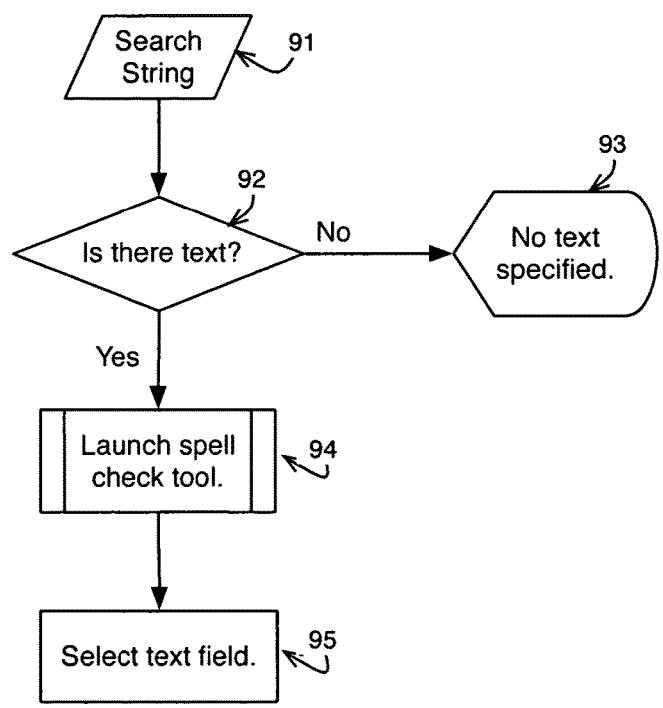

Dynamic software technique (fig. 10)
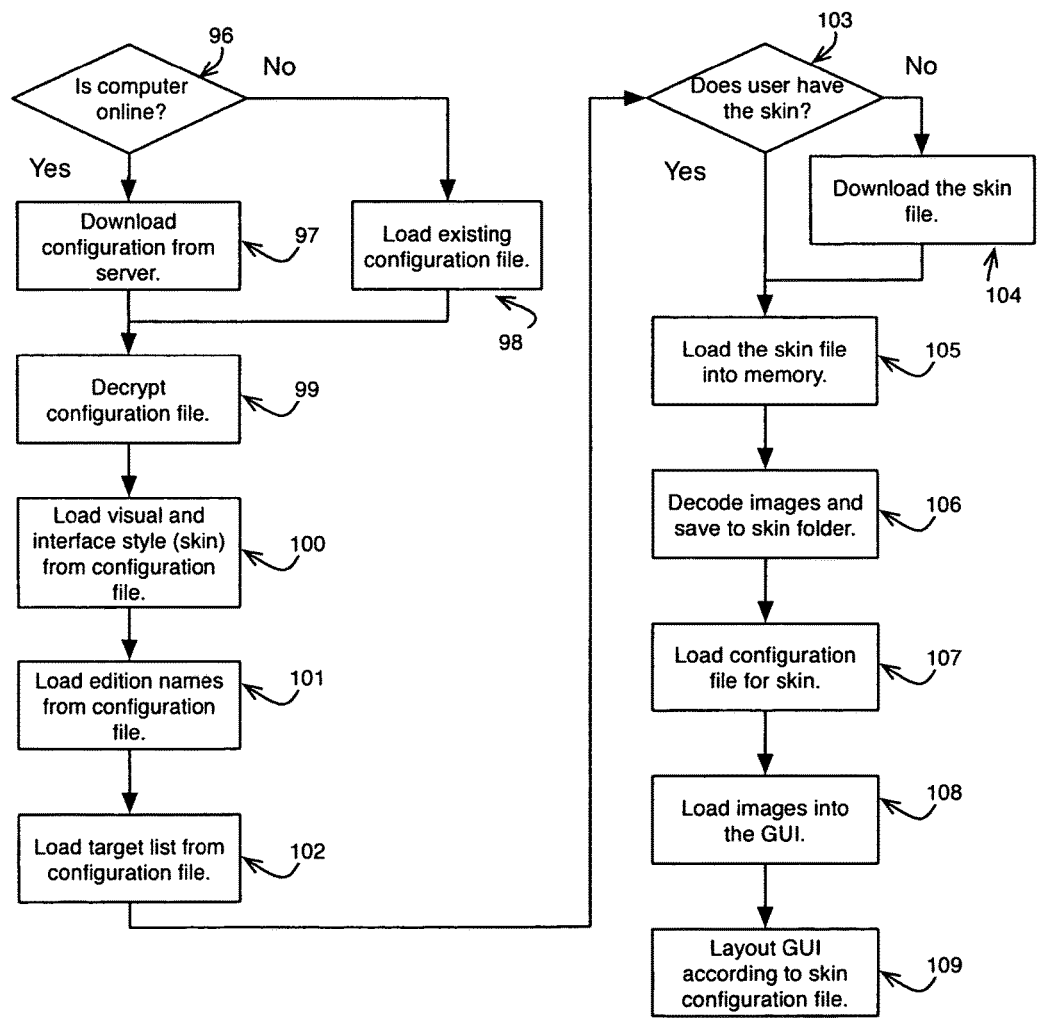

Dynamic software target processing (fig. 11)
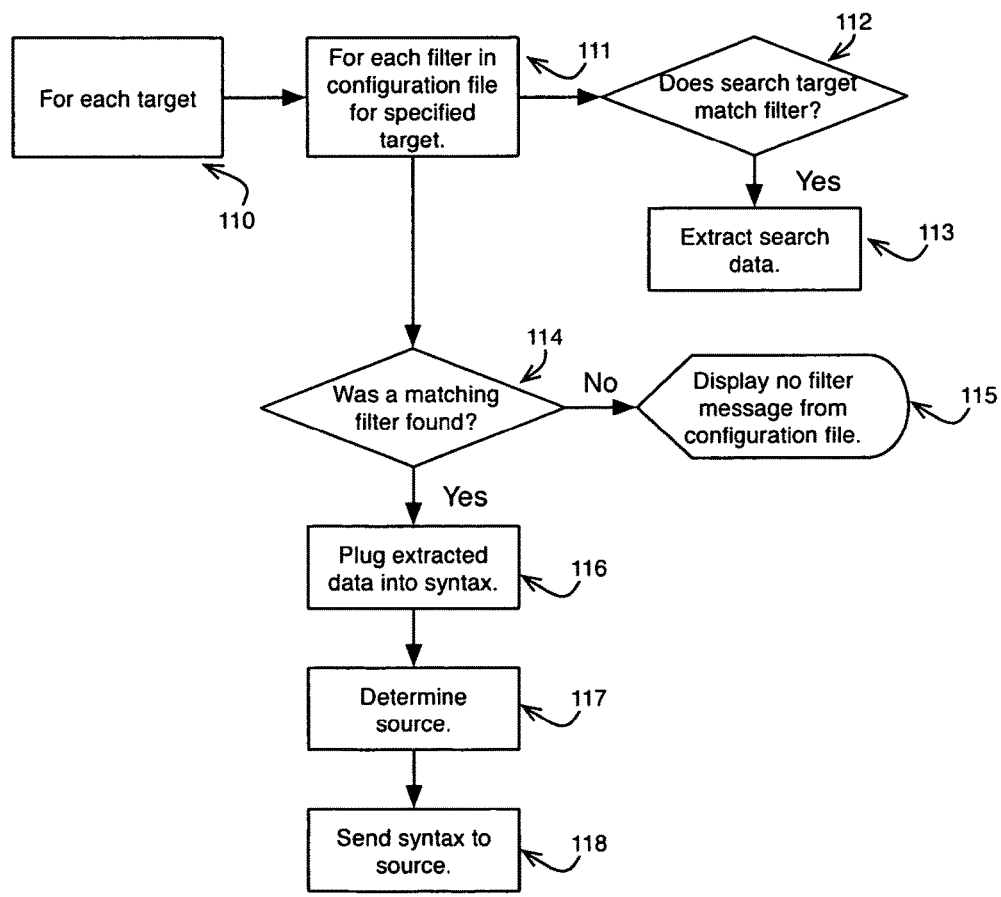

Load in background (fig. 12)
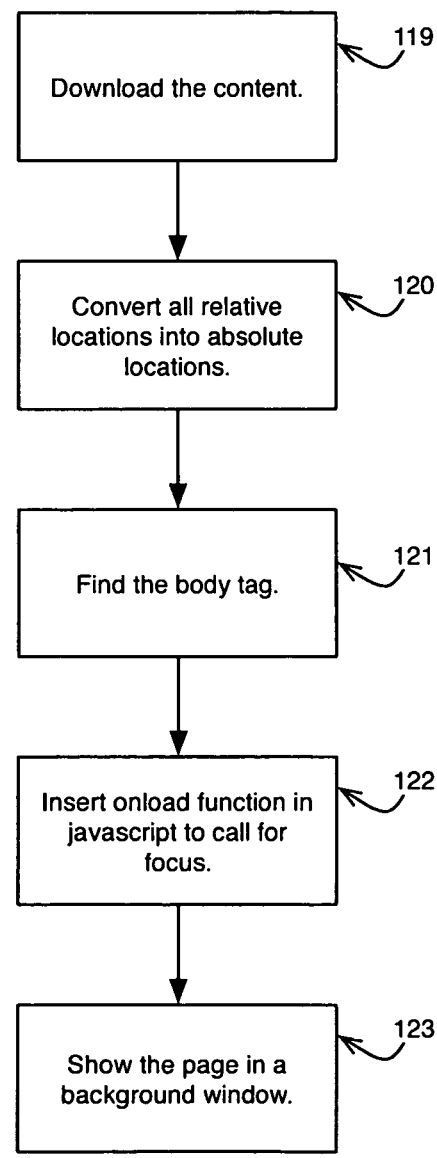

Load in background (fig. 13)
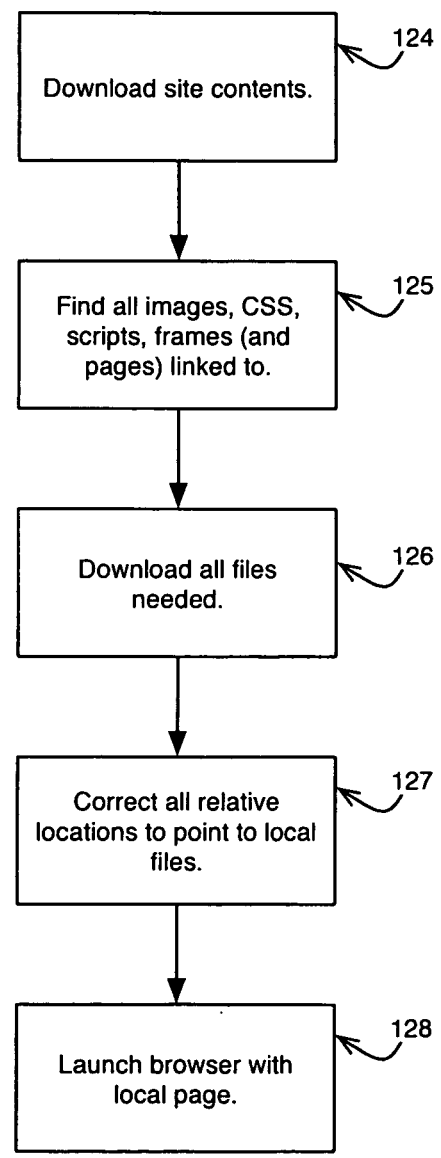

Preview search results (fig. 14)
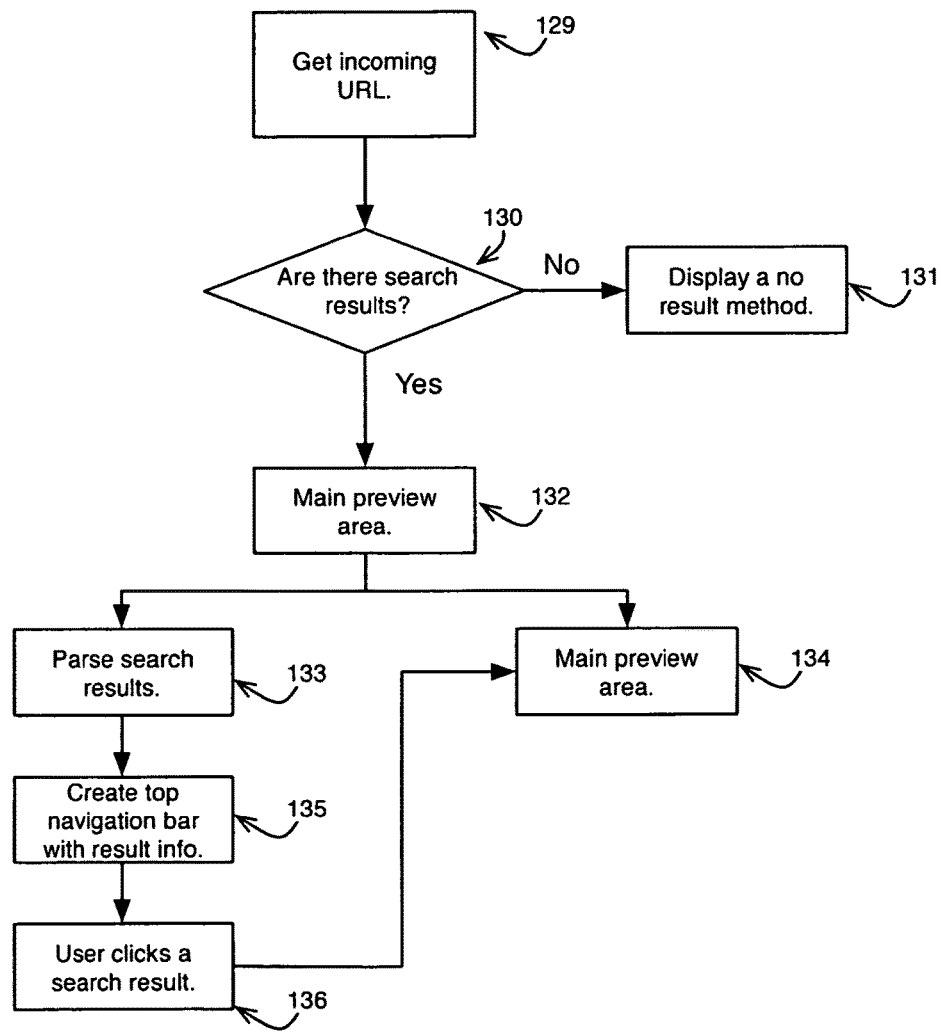

METHOD FOR PERFORMING A SEARCH, AND COMPUTER PROGRAM PRODUCT AND USER INTERFACE FOR SAME

BACKGROUND OF THE INVENTION

1. Field of the Invention

The present invention relates to a method of performing a search of any number and/or combination of internal, local, remote and global computer networks and data sources. Also, the present invention relates to a computer program product, computer system, user interface, and/or computer readable recording medium for performing the above-mentioned method. The present application claims benefit of priority based on Provisional Application No. 60/333,493 filed on Nov. 28, 2001, which is incorporated herein by reference.

2. Description of the Prior Art

At a high level, current access to computer networks is primarily through web browsers like Netscape Communicator and Microsoft's Internet Explorer. When a user wants to access a certain web site or data from a remote computer, they must complete several steps: first, opening a browser and assuring that their computer access device is online, then choosing through links, bookmarks or by manually typing a specific web site, a data source or access point, then, assuming they wants to search a particular source for specific information, the individual must type in their desired search criteria and click the "search" button. If the user wants to search several remote computers/sites at once to ensure a more thorough search, the user must open new browser windows, type in the new web site address and then retype in the search criteria and press "search", or wait and do serial searches, one at a time, through the single open browser. Thus, a problem in the conventional art is that it is inefficient and time consuming for a user to search multiple websites simultaneously.

SUMMARY OF THE INVENTION

The present invention has been developed in order to solve the above-mentioned problems in the related art. Accordingly, the present invention provides a method, system, client server, computer program product, and apparatus for solving the above-mentioned problems in the related art.

Another object of the present invention is to provide a single computer access device graphical user interface from which users can access and/or search any number and/or combination of internal, local, remote and global computer networks and data sources simultaneously.

Yet another object of the present invention is to provide a significantly more efficient and integrated system for accessing multiple internal, local, remote and global computer networks and data sources. For example, the computer software, according to the present invention, can be easily adapted and used with all newly developed and yet to be developed access hardware, including but not limited to PDA's and other hand held devices, pagers, cell phones, etc. This software may also easily be adapted for voice-activated and alternatively activated computer access technologies, such as voice access of multiple local, remote and global computers and computer networks over an access line.

To achieve the foregoing objects, there is provided a method of accessing computer networks and data sources, the method including the steps (a) selecting a target source to be accessed; and (b) running a target parsing tool of the target source if parsing is required. This method can further include the steps of (c) launching the target source that is selected; (d) tracking data related to the launching of the selected target source; and (e) determining whether to revert back to a default option.

Step (e), as set forth above, can comprise the sub-steps of (f1) determining whether a predetermined amount of time has passed; and (f2) if the predetermined amount of time has passed, returning a search list back to the default option if a user has not selected a different target source or entered search terms in the predetermined amount of time that has passed.

The method, as discussed above, can further include the steps of determining whether entered search data is in a history list, adding the search data to the top of the history list if it was not already in the history list, and moving the search data to the top of the history list if it is already in the history list.

Yet further, in the above-discussed method, when the selected target source is related to business phone numbers, the method can include the steps of determining whether there is text in a search string, launching a business phone listings page if no text is in the search string, determining whether there is one comma in the search string if there is text in the search string, setting text before the comma to a name if there is one comma in the search string, determining whether the text after the comma is two (2) letters; setting the text after said the comma to a city if the text after the comma is not two (2) letters; and setting the text after the comma to a state if the text after the comma is two (2) letters. Also, this method can further include the steps of determining whether there are two commas in the search string if there is not only one comma in the search string; sending an incorrect format message if there are not two commas in the search string; setting the text before a first comma to a name, setting the text after said first comma to a city, and setting the text after a second comma to a state, if there are two commas in the search string.

Further, when the selected a target source is related to home phone listings, the method can include the steps of determining whether there is text in a search string, launching a home phone listings page if no text is in the search string, determining whether there is one comma in the search string if there is text in the search string, setting text before the comma to a name if there is one comma in the search string, determining whether the text after the comma is two (2) letters, setting the text after the comma to a city if the text after the comma is not two (2) letters; and setting the text after the comma to a state if the text after the comma is two (2) letters. The method can further include the steps of determining whether there are two commas in the search string if there is not only one comma in the search string; sending an incorrect format message if there are not two commas in the search string; and setting the text before a first comma to a name, setting the text after the first comma to a city, and setting the text after a second comma to a state, if there are two commas in the search string.

Yet further, when the selected target source is related to maps, the method can include the steps of: determining whether there is text in a search string; launching a home page related to maps if no text is in the search string; determining whether there is only one comma in the search string if there is text in the search string; determining whether the text after said one comma is two (2) letters if it is determined that there is only one comma in the search string; setting text before the comma to a city and setting text after the comma to a state, if the text after the first comma is two (2) letters; and setting text before the comma to an address and setting text after the comma to a city, if the text after the first comma is not two (2) letters. Also, this method can further include the steps of: determining whether there are no commas in the search string if there is not only one comma in the search string; determining whether the search string comprises two (2) letters, if there are no commas in the search string; setting the search string text to a state, if the search string has two (2) letters; and setting the search string text to a city, if the search string does not have two (2) letters. This method further includes the steps of: determining whether there are only two commas in the search string; sending an incorrect format message if there are not two commas in the search string; and setting the text before a first comma to an address, and setting the text after said first comma to a location, if there are only two commas. For example, if the search string is "5768 Corrales Rd., Corrales, N.Mex.", then "Corrales, N.Mex." will be set as the location.

Yet even further, when the target source that is selected relates to movie listings, the above-discussed method can include the steps of: determining whether there is text in a search string; loading a zip code from a registry and launching a home page related to movie listings, if no text is in the search string; determining whether the search string is a five (5) digit number, if there is text in the search string; setting the five (5) digit number to a zip code, if the search string is a five (5) digit number; setting the text to a movie title and loading a zip code from a registry, if the search string is not a five (5) digit number; and launching a movie listings home page.

When the target source relates to e-mail, the above-discussed method can include the steps of: determining whether entered text is an e-mail address; setting text as an e-mail address, if the entered text is an e-mail address; and setting text as an e-mail subject, if the entered text is not an e-mail address.

When the target source that is selected is a spell-checker, the method can include the steps of: determining whether text has been entered; launching a spell check tool, if text has been entered; and displaying a message indicating that no text was entered, if no text has been entered.

Also, to achieve the objects set forth above, a method of previewing search results is provided. This method can include the steps of: receiving a uniform resource locator (URL) for a search results page; determining whether there are search results; notifying the user of no results and stopping execution of a search, if there are no search results; creating a frame set, wherein the frame set comprises a preview area and a search results area. When a user selects a search result, a home page of the selected search result can be displayed in the preview area.

Also, according to the present invention, a user interface for accessing multiple target sources is provided. The user interface includes: a text entry field; a scroll-down menu for selecting one or more target sources; and an infobar for displaying information. The target sources can be search engines, a spell-checker, a target source related to movie-listings, and/or a target source related to maps. Preferably, the infobar is at the bottom of the user interface. Also, preferably, the information displayed in the infobar includes news headlines, weather information, and/or stock quotes.

Finally, to achieve the above-stated objects, there is provided a computer program product for enabling a computer to perform a method of accessing computer networks and data sources, the computer program product can include a computer readable medium, and instructions, on the computer readable medium. These instructions are for performing the steps of selecting at least one of a target source to be accessed; and (b) running a target parsing tool of the target source if parsing is required.

BRIEF DESCRIPTION OF THE DRAWINGS

FIG. 1 shows a flowchart illustrating the steps of selecting a target that requires no parsing.

FIG. 2 is a flowchart illustrating the actions taken when the auto revert timer activates.

FIG. 3 is a flowchart illustrating the actions that occur when the user presses a "Go" button, showing the usage checks, auto revert activator and calls to the parsing functions.

FIG. 4 is a flowchart illustrating the process for parsing business phone searches.

FIG. 5 is a flowchart illustrating the process for parsing home phone number searches.

FIG. 6 is a flowchart illustrating the process for parsing map searches.

FIG. 7 is a flowchart illustrating the movie search parsing algorithm.

FIG. 8 is a flowchart illustrating how e-mail searches are parsed and handled.

FIG. 9 is a flowchart depicting the algorithm for launching the spell check tool.

FIG. 10 is a flowchart illustrating the steps that occur when loading Dynamic Software configuration files, which sets up the software by determining how it operates, as well as the appearance to the end user. The Dynamic Software can download a file that determines the layout, operation and specific functionality of the GoBox. For example, a new layout can be uploaded to the web, then when someone opens their GoBox up, the Dynamic Software can automatically incorporate the changes.

FIG. 11 depicts the Dynamic Software parsing algorithm for determining the target, extracting data and launching a data source.

FIG. 12 depicts a method for launching a website that will appear to the user when downloaded.

FIG. 13 depicts another method for launching a website, providing faster access for the user and less lost time.

FIG. 14 depicts a method for displaying results along with websites.

DETAILED DESCRIPTION OF THE PREFERRED EMBODIMENT

Hereinafter, the present invention will be described in greater detail. Also, further below, the present invention will be described in greater detail with reference to the accompanying drawings.

The present invention can provide a method, computer system, computer program product, and/or user interface for accessing computers and computer networks. For example, a user interface can feature a user data entry location for search criteria and a list of internal, local and global computer network and data source target locations to be utilized in searching for the specific criteria, through the use of a computer program. The computer program, according to the present invention, can verify that a user's computer has access to the internal, local or global computer network or data source to be searched, attempt to connect the user's computer if the computer is not already connected to said network or data source, contact the specified target source(s) to be searched, parse and enter search criteria and request results of a search from the target source location (internal, local or global computer network or data source location).

The program allows for multiple target sources to be searched simultaneously for the entered search criteria, thus opening multiple windows, each with results from a specific target location (examples: Yahoo, Google, CNN News, Ebay, spell check, company client database, or user's computer). If no search criteria are entered, the primary or 'home' page/interface for each chosen target location can be opened and presented. Further, the program can stay "on top", i.e. in the forefront of currently running applications and allows the user to initiate any number of new searches while any number of previous searches are already in progress. This allows significantly greater efficiency and flexibility in accessing the user's own computer, local, company and/or network databases, and/or internal, local and global computer networks, while continuing to work on an open application.

Yet further, the program, for example, can allow users to have the option of having the results of any search appear only upon completion of the downloading of all data from the internal, local and/or global computer network and/or data source, for example: the browser or results page can be set to not appear until it is fully downloaded.

Yet even further, the computer program can allow users the option of having the multiple html links/targets referred to in any search results page to be automatically and individually loaded and opened. For example, if the user searched Google for "sculpture" utilizing this option, not only would the Google page with indexed results from the search for "sculpture" appear, but the multiple target sites referred to in any search results would also be loaded and opened (the user choosing the number of results sites to load/open, example: "first 5" or "first 10"). The multiple target sites/pages referred to in a results page can be opened either as separate browser windows/screens, or by being ordered within individual browser frames that relate to and can be controlled by a separate static frame offering basic target information and navigation tools for the quick access, viewing and comparison of said sites/pages.

Also, the program, according to the present invention, can reset search target location to user's chosen default search target location after a quantitative interval of time. The program can reset search criteria at the user data entry location to blank/empty after each search. The computer program can provide for instant accessibility of recent search criteria from a pull down list at the user data entry location, allowing for quick and efficient use of previous search criteria in future searches. Additionally the program can allow for the entering and storage of multiple user specific preferences, including the default search target. For example, if the user enters a list of stock symbols, a zip code or city name, and/or other requested information, a scroll bar at the bottom of the computer program can continuously update and provides current weather conditions, news, stocks, and other assorted customized information.

Finally, the computer program, according to the present invention, can monitor usage and prompt each user for feedback and referrals after set quantitative sums of usage.

Although some details of the present invention have been described above, further details of the invention will be described below with reference to the accompanying drawings.

FIG. 1 shows what happens when a user enters search data (1) for a target that does not require parsing. For example, when searching Google or Amazon, if the user enters search terms (2), then the program will launch the user's browser to the site, inserting the search term via URL (4). If the user leaves the search field blank, then, if there is a default site specified (3), the URL for the default site will be launched (6), otherwise, an error will be displayed to the user indicating that no data was specified (5).

As illustrated in FIG. 2, when a certain amount of time, i.e. 40 seconds, has passed after a search (7), then the program will auto revert to a user selected default target (9), but only if the user has not selected a different target or entered new search terms (8).

FIG. 3 illustrates a main search method, which can occur when a user presses the search button. First, an increment counter will be updated recording another use (10) to the user's registry. Then, for each target (11), the program will determine if that target is selected (12), then, if it is, will run the parsing tool specified for that target (13) and add a short message to the bottom of the tracking log (14). At this point, the auto revert counter (see FIG. 2) can be activated (15). If the search terms have been search for before (16), they can be moved to the top of the search history (17), which appears in the search combo box. Otherwise, the search terms can be added to the beginning of the search history (18). If the user has used the tool (for example) 100 times (19), then a "Well Used" window can appear (21), asking the user for feedback. If the tool has (for example) 48 uses (20), then, if the user hasn't registered (22), the registration window can appear (23).

FIG. 4 illustrates the process when a user searches business phone listings. That is, the procedure shown in FIG. 4 is used to extract the information which will be inserted into a URL. When a search of business phone listings is invoked by a user, if a search string (24) has not been provided by the user (25), then the business phone home page is launched (26) and the procedure ends. Otherwise, if there is one comma in the string (27), then the text before the comma can be set as the name (28). If the text after the comma is two letters (31), then it can be set as the state (36), otherwise it can be set as the city (36). If there are more than two commas in the string (29), then the user will see an incorrect format message and the procedure will end (30), but if there are two commas, then the text before the first comma is set as the business name (32), the text in between the two commas is set as the city (34) and the text after the last comma is set as the state (35). If all data is valid (i.e.: the state is 2 letters, a business name is specified, etc) after being extracted (37), then the business pages are launched with the data entered (39), otherwise the user sees an incorrect format error (38).

Another aspect of the present invention is shown in FIG. 5, wherein the process for searching home phone listings is shown. The process is used to extract the information which will be inserted into the URL. If a search string (40) has not been provided by the user (41), then the home phone listings home page is launched (42) and the procedure ends. Otherwise, if there is one comma in the string (43), then the text before the comma can be set as the name (44), for example. If the text after the comma is two letters (47), then this text can be set as the state (51), otherwise it is set as the city (49). If there are more than two commas in the string (45), then the user may see an incorrect format message and the procedure ends (46), but if there are two commas, then the text before the first comma can be set as the name (48), the text in between the two commas can be set as the city (50) and the text after the last comma can be set as the state (52). The name can be split into the first and last name (53). If all data is valid (i.e.: the state is 2 letters, a last name is specified, etc) after being extracted (54), then the home phone listings pages are launched with the data entered (56), otherwise the user sees an incorrect format error (55).

FIG. 6 illustrates a procedure, according to the present invention, of a user searching a map database. This procedure, as illustrated below, can be used to extract the information which will be inserted into the URL. If the search string (57) entered by the user is blank (58), then launch the map home page URL and stop executing this procedure (59). If the search string has one comma (60), then, if the text after the comma is 2 letters (62), the text after the comma can be set as the state (69) and the text before the comma can be set as the city (66), otherwise the text before the comma can be set as the address (67) and the text after the comma can be set as the city (70). If there are no commas in the search string (61), then, if the search string is two letters, set the search string as the state (71), otherwise set it as the city (72). If there are more than two commas (63), then an incorrect format message can be shown to the user and the procedure will end (64). If there are only 2 commas, then the data before the first can be set as the address (68), while the data after the first comma can be set as the location (73). If all data is valid (i.e.: state is two letters, etc) when checked (74), then the maps page can be launched with all data filled into the URL (76), otherwise an incorrect format error can be shown to the user (75).

FIG. 7 shows a flowchart illustrating a method that can be used to parse a movie search string (77). If there is no string specified (78), then the zip code for weather can be loaded from the registry (79) and used to bring up local movie listings (80). If the search text is a 5 digit number (81), then it can be treated as the zip code to find listings at (83), otherwise the zip code from the registry can be used (84) along with the search string as the movie title (82) to find show times. This data is used to launch the movie page.

FIG. 8 illustrates a method used when there is an e-mail related target source. When the search string (86) is an e-mail address (87), then the search string can be set as the e-mail address for the new e-mail (88), otherwise the search string can be used as the subject of the new e-mail (89). The program can then use the Shell command, launch the user's e-mail software using mailto syntax (90).

FIG. 9 illustrates a procedure that is executed when the user enters text (91) to be spell checked. If there is no text (92), then a message tells the user to enter text (93), otherwise the spell check tool runs (94) and can insert the text into the search field, which is highlighted (95).

FIG. 10 illustrates a technique, e.g., a Dynamic Software technique, that allows software that is published to be maintained, using downloadable configuration files, which determine targets, parsing algorithms, infobar sources, skins and variations. The skin files determine the appearance, allowing the software creators to modify software appearance at any time. First, if the computer is online (96), then the program can download the new configuration file (97), otherwise the existing configuration file can be used (98). The configuration file is decrypted internally (99), which prevents users from modifying the software. The software loads all skin names from the configuration file (100), so that the program can download the main skin or allow the user to change skins. Next, program variations are loaded from the configuration file (101). Finally, the target list is populated using the configuration file. If the user does not have the skin that their version is set to use (103), then it is downloaded (104). The skin is loaded to memory (105) and all files in it are decoded and saved to the skin folder (106). The configuration file for the skins is loaded (107), allowing the pictures to be loaded (108) and the items to be arranged (109).

FIG. 11 shows a method in which the Dynamic Software can use a different main search program, using customizable parsing algorithms. For each target (110), the following procedure is run. Each filter is tested (111), until a fitting filter is found (112) and the data is extracted (113). If no fitting filter was found (114), then the user receives an error message found in that target's part of the configuration file (115). The extracted data found using the filter is entered into the search syntax (116), which can be in a variety of forms, including mailto, URL or local shell. Depending on the type of search (117), the syntax is sent to the appropriate handler.

In FIG. 12, an example of background loading using a background tool is explained in this flowchart. The source from the site is downloaded (119) and all relative locations are converted into absolute paths, depending on the domain and folder (120). For example, "/index.html" can become an absolute URL, such as "http://www.maxmo.net/index.html". The body tag can be found (121) by searching the HTML for the code "<body" and can be appended with a JavaScript onload event, which gives the form focus (122). The code can read onLoad="window.setFocus( );" The page is launched minimized (123), and when the page is loaded, the JavaScript will execute and the site will appear.

In FIG. 13, another method for background loading of websites is shown; this method being more complex. The site source is downloaded (125). All images, style sheets (CSS), scripts, frames, layers, etc which refer to off site sources are found and recorded (125). All the files found are downloaded to the computer (126). The source is updated, to point to the downloaded files which exist in the same folder (127). This page is then launched in the browser (128).

In FIG. 14, a method for previewing and searching results is shown. First, the URL for the search results page is retrieved (129). During a preliminary parse, if there are no results (130), the user can be notified of such and execution can be stopped (131), otherwise a frameset can be created (132). The frameset is divided in two parts, one where the preview appears (134), and the other where a navigation bar shows brief results (135). This frameset, parsing the search URL specified in the previous main page (133), extracts results and creates the navigation bar (136). When the user clicks a result (136), the page is displayed in the preview area (134).

Based on the above-described invention, a significantly more efficient and integrated system for accessing multiple internal, local, remote and global computer networks and data sources can be achieved.

The foregoing embodiments and advantages are merely exemplary and are not to be construed as limiting the present invention. The description of the present invention is intended to be illustrative, and is not intended to limit the scope of the claims. Many alternatives, modifications, and variations will be apparent to those skilled in the art. In the claims, means-plus-function clauses are intended to cover the structures described herein as performing the recited functions.

What is claimed is:

1. A method of accessing target sources, said method comprising the steps:

(a) selecting a plurality of said target sources comprising at least one of a website and a search engine, to be accessed and determining whether or not a target parsing tool is necessary for each of the selected plurality of target sources;

(b) in response to the determining that the parsing tool is necessary, running the target parsing tool for each of said plurality of target sources for which parsing is determined to be required;

(c) determining that a history list related to search data contains entered search data;

(d) adding the search data to the top of the history list when the search data is not already in the history list; and (e) moving the search data to the top of the history list when the search data is already in the history list, wherein the selected plurality of target sources are searched at substantially the same time based on user input search criteria, wherein, in response to determining that the target parsing tool is necessary for one of the selected plurality of target resources, applying the target parsing tool to a user input query, and wherein, in response to determining that the target parsing tool is not necessary for one of the selected plurality of target resources, providing the user input query without parsing.

2. The method according to claim 1, wherein said entered search data is a uniform resource locator (URL) and wherein the parsing tool is specific to the target source and wherein the method further comprises: determining number of uses of said parsing tool, in response to the determining that the number of uses is more than a first threshold number, displaying a window asking the user for feedback, in response to the determining that the number of uses is less than the first threshold number and more than a second threshold number, displaying a registration window, and in response to the determining that the number of uses is less than a second threshold number, not displaying any windows, and wherein each time, the parsing tool is used, a message is added to a bottom of a tracking log to determine the number of uses.

3. The method of claim 1, further comprising:
in response to receiving the search data input by a user into a desktop standalone application, opening and launching an Internet browser; and receiving a search string in a single data field, wherein said search string is parsed by said target parsing tool.

4. The method according to claim 1, said method further comprising: (f) adjusting the history list to reflect recent searches while removing duplicates from the history list.

5. The method according to claim 1, wherein the history list is a text-based history list.

6. The method according to claim 1, wherein the plurality of target sources are search engines and wherein, for each of the plurality of the selected target sources, a new results window is generated with search results for the respective selected target source based on the input search criteria.

7. The method according to claim 6, wherein a plurality of results windows are generated at substantially the same time based on said searches.

8. The method according to claim 7, wherein the plurality of generated results windows are automatically opened together and wherein for each of a predetermined number of search result items displayed on one of the generated results windows, a new page is automatically and individually opened.

9. The method according to claim 8, wherein new pages corresponding to the predetermined number of search result items are separate static frames.

10. The method according to claim 1, wherein search results from searching the selected plurality of target sources, appear in a single results window.

11. The method according to claim 1, wherein the selected plurality of target sources comprises at least two global search engines and wherein the method further comprises: receiving the selection from a user of the plurality of said target sources and wherein the selecting and the entered search data is provided on a desktop research tool.

12. The method according to claim 1, wherein the target sources are internal, local, and global sources and wherein the selected plurality of target sources comprises at least two global target sources.

13. The method of claim 1, wherein, while the search data is being searched for and generated, initiating a new search with an input new search criteria and searching for the input new search criteria in the selected plurality of target sources.

14. The method of claim 13, wherein the input new search criteria is unrelated to a search criteria input for searching and generating the search data.

15. The method of claim 1, further comprising:
filtering search results from searching the selected plurality of target sources based on at least one of user defined and system defined criteria; and
displaying the filtered search results in a predetermined ordered based on said filtering.

16. The method of claim 1, further comprising:
searching the selected plurality of said target sources based on a preset criteria;
storing search results on at least one of internal memory, local memory, and global memory; and
searching the stored search results based on at least one of user-specified and system-specified criteria.

17. The method of claim 1, further comprising providing search results separately in a respective window of a respective target source from among the selected plurality of target sources.

18. The method of claim 1, wherein for each of said plurality of the selected target sources, selecting one of: the entered search data and the parsed entered search data based on a type of target source and inputting the selected one into as a search string for the respective target source.

19. The method of claim 1, wherein one of the selected target sources is the spell checking tool.

20. A method of accessing target sources comprising:
(a) selecting a plurality of said target sources comprising at least a website, a search engine, and a spell check tool, to be accessed;
(b) running a target parsing tool of said plurality of target sources when parsing is determined necessary for a respective target source from among said plurality of target sources;
(c) receiving user input comprising search data;
(d) checking the input search data in a history list; and
(e) in response to the input search data not being found in the history list, adding the search data to the history list and in response to the input search data being present in the history list, moving the search data to a top of the history list,
wherein the selected plurality of target sources are searched at substantially the same time based on the input search data.

21. The method of claim 20, further comprising:
determining whether a predetermined amount of time passed after the input search data is received; and
in response to the determining yielding that the predetermined amount of time passed after the input search data is received, displaying options for a search criteria based on matching the input search data with data in the history list;
receiving a selection of the search criteria; and
searching the selected plurality of target sources based on the selection of the search criteria.

22. The method of claim 21, wherein said matching comprises: launching a spell check tool which compares the input search data with strings in a stored dictionary; selecting strings from the dictionary based on a matching criteria and displaying the selected strings as said options for the search criteria.

23. The method of claim 21, wherein the history list comprises the options for the search criteria and search criteria of prior searches by same user.

24. The method of claim 22, wherein the spell check tool is launched in response to the user entering text and wherein, when no text has been input, outputting a message requesting input of the text.

* * * * *